(12) United States Patent
Huang

(10) Patent No.: US 6,901,353 B1
(45) Date of Patent: May 31, 2005

(54) COMPUTING INSTANTANEOUS FREQUENCY BY NORMALIZING HILBERT TRANSFORM

(75) Inventor: Norden E. Huang, Bethesda, MD (US)

(73) Assignee: The United States of America as represented by the Administrator of the National Aeronautics and Space Administration, Washington, DC (US)

(*) Notice: Subject to any disclaimer, the term of this patent is extended or adjusted under 35 U.S.C. 154(b) by 82 days.

(21) Appl. No.: 10/615,365

(22) Filed: Jul. 8, 2003

(51) Int. Cl.[7] .............................................. G06F 19/00
(52) U.S. Cl. .................... 702/189; 702/67; 702/104; 702/179
(58) Field of Search ............................. 702/39, 79, 66, 702/67, 104, 179, 189; 250/208.1; 356/121; 707/3; 708/300

(56) References Cited

U.S. PATENT DOCUMENTS

| | | | |
|---|---|---|---|
| 5,750,024 A | * | 5/1998 | Spearman .................... 210/315 |
| 5,916,435 A | * | 6/1999 | Spearman et al. ........... 210/132 |
| 5,983,162 A | | 11/1999 | Huang ............................. 702/4 |
| 6,311,130 B1 | | 10/2001 | Huang ............................. 702/2 |
| 6,381,559 B1 | | 4/2002 | Huang ......................... 702/194 |
| 6,507,798 B1 | * | 1/2003 | Salvino et al. ................. 702/75 |
| 6,631,325 B1 | * | 10/2003 | Huang et al. .................... 702/3 |
| 6,782,124 B2 | * | 8/2004 | Gloersen ..................... 382/154 |

OTHER PUBLICATIONS

Norden Huang, The empirical decomposition and the Hilbert spectrum for nonlinear and non-stationary time series analysis, Proc. of The Royal Society, pp903–995.

* cited by examiner

Primary Examiner—Marc S. Hoff
Assistant Examiner—Felix Suarez
(74) Attorney, Agent, or Firm—Keith L. Dixon; Chan K. Park

(57) ABSTRACT

This invention presents Normalized Amplitude Hilbert Transform (NAHT) and Normalized Hilbert Transform (NHT), both of which are new methods for computing Instantaneous Frequency. This method is designed specifically to circumvent the limitation set by the Bedorsian and Nuttal Theorems, and to provide a sharp local measure of error when the quadrature and the Hilbert Transform do not agree. Motivation for this method is that straightforward application of the Hilbert Transform followed by taking the derivative of the phase-angle as the Instantaneous Frequency (IF) leads to a common mistake made up to this date. In order to make the Hilbert Transform method work, the data has to obey certain restrictions.

11 Claims, 15 Drawing Sheets

Time: Second ÷ 22050

Time: Second ÷ 22050

COMPUTING INSTANTANEOUS FREQUENCY BY NORMALIZING HILBERT TRANSFORM

ORIGIN OF INVENTION

The inventor of the invention described herein is an employee of the United States Government. Therefore, the invention may be manufactured and used by or for the Government for governmental purposes without the payment of any royalties thereon or therefor.

BACKGROUND OF THE INVENTION

The term 'Instantaneous Frequency (IF)' has elicited strong opinions amongst the data analysis community. The range covers from 'banishing it forever from the dictionary of the communication engineer (Shekel, 1953)' to being a 'conceptual innovation' in assigning physical significance to the nonlinearly distorted waveforms (Huang et al 1998)'. In between these extremes, there are plenty of more moderate opinions stressing the frustration of finding an acceptable definition. In general, most of the investigators accept the definition of classical wave theory, the derivative of the phase (see, for example, Cohen, 1995). But questions of its validity persist.

Yet the need for instantaneous frequency is a real one for data from nonstationary and nonlinear processes. Certainly, the non-stationarity is a key feature here, but IF is even more important for nonlinear processes. If the process is non-stationary, the frequency should be ever changing, albeit at a slow rate. Then, there is a need for frequency value as a function of time, for the value will not be constant throughout. For the nonlinear cases, the oscillation can be viewed as intra-wave frequency modulation (Huang et al, 1998, 1999). Therefore, it is compelling to clarify the concept of, to settle these arguments on, and to provide a workable method for implementing the IF.

To date the most popular and direct method to define Instantaneous Frequency is through the Hilbert Transform (HT). Yet practical difficulties of implementation make it not only useless, but also controversial. Straightforward application of HT and then taking the derivative of the phase-angle as the instantaneous frequency is the common mistake made up to this date (Hahn, 1995). In order to make the HT method work, the data has to obey certain restrictions.

Some publications relating to Instantaneous Frequency are listed below:

Bedrosian, E., 1963: On the quadrature approximation to the Hilbert Transform of modulated signals. Proc. IEEE, 51, 868–869.

Boashash, B., 1992a: Estimating and interpreting the instantaneous frequency of a signal. Part I: Fundamentals, Proc. IEEE, 80, 520–538.

Boashash, B., 1992a: Estimating and interpreting the instantaneous frequency of a signal. Part I: Algorithms and Applications, Proc. IEEE, 80, 540–568.

Cohen, L., 1995: *Time-frequency Analysis*, Prentice Hall, Englewood Cliffs, N.J.

Daubechies, I., 1992: *Ten Lectures on Wavelets*, Philadelphia SIAM.

Flandrin, P., 1999: *Time-Frequency/Time-Scale Analysis*, Academic Press, San Diego, Calif.

Gabor, D., 1946: Theory of communication, J. IEE, 93, 426–457.

Goldstein, H., 1980: *Classical Mechanics*, $2^{nd}$ Ed., Addison-Wesley, Reading, Mass.

Hahn, S., 1995: *Hilbert Transforms in Signal Processing*, Artech House, Boston, Mass.

Huang, et al. 1998: The empirical mode decomposition and the Hilbert spectrum for nonlinear and non-stationary time series analysis. Proc. Roy. Soc. Lond., 454, 903–993.

Huang, N. E., Z. Shen, R. S. Long, 1999: A New View of Nonlinear Water Waves—The Hilbert Spectrum, Ann. Rev. Fluid Mech. 31, 417–457.

Kaiser, J. F., 1990: On Teager's energy algorithm and its generalization to continuous signals. Proc. $4^{th}$ IEEE Signal Processing Workshop, Mohonk, N.Y.

Landau, L. D. and E. M. Lifshitz, 1976: *Mechanics*, $3^{rd}$ Ed. Pergamon, Oxford.

Maragos, P., J. F. Kaiser, and T. F. Quatieri, 1993a: On amplitude and frequency demodulation using energy operators, IEEE Trans. Signal Processing, 41, 1532–1550.

Maragos, P., J. F. Kaiser, and T. F. Quatieri, 1993b: Energy separation in signal modulation with application to speech analysis, IEEE Trans. Signal Processing, 41, 3024–3051.

Meville, W. K., 1983: Wave modulation and breakdown, J. Fluid Mech., 128, 489–506.

Nuttall, A. H., 1966: On the quadrature approximation to the Hilbert Transform of modulated signals, *Proceedings of IEEE*, 54, 1458–1459.

Rice, S. O., 1944a: Mathematical analysis of random noise, Bell Sys. Tech. Jl., 23, 282–310.

Rice, S. O., 1944b: Mathematical analysis of random noise, III. Power spectrum and correlation functions, Bell Sys. Tech. Jl., 23, 310–332.

Rice, S. O., 1945a: Mathematical analysis of random noise, III. Statistical properties of random noise currents, Bell Sys. Tech. Jl., 24, 46–108.

Rice, S. O., 1944a: Mathematical analysis of random noise, IV. Noise through nonlinear devices, Bell Sys. Tech. Jl., 24, 109–156.

Infeld, E. and G. Rowland, 1990: Nonlinear waves, solutons and chaos, Cambridge University Press, Cambridge.

Shekel, J., 1953: Instantaneous Frequency. Proc. I.R.E. 41, 548.

Van der Pol, B., 1946: The fundamental principles of frequency modulation, Proc. IEE, 93, 153–158.

Whitham, G. B., 1975: *Linear and Nonlinear Waves*, New York, Wiley.

The following U.S. Patents are incorporated by reference:

U.S. Pat. No. 5,983,162 "Computer Implemented Empirical Mode Decomposition Method, Apparatus and Article of Manufacture"

U.S. Pat. No. 6,381,559 "Empirical Mode Decomposition Apparatus, Method and Article of Manufacture for Analyzing Biological Signals and Performing Curve Fitting"

U.S. Pat. No. 6,311,130 "Computer Implemented Empirical Mode Decomposition Method, Apparatus and Article of Manufacture for Two-Dimensional Signals"

SUMMARY OF THE INVENTION

The present invention is an improvement over the Hilbert Transform. Specifically, this invention introduces an improved Hilbert Transform application, the Normalized Amplitude Hilbert Transform (NAHT) and the Normalized Hilbert Transform (NHT). This new application circumvents most of the difficulties of the straightforward Hilbert Transform such as the limitation described in the Bedrosian (Bedrosian, 1963) and the Nuttal Theorems.

The invention is directed to a method of computing Instantaneous Frequency (IF) of a signal. The method comprises: inputting the signal, extracting a collection of Intrinsic Mode Functions from the signal via Empirical Mode Decomposition, normalizing the Intrinsic Mode Functions, and transforming the normalized Intrinsic Mode Functions with a Hilbert Transform. The resulting Hilbert Transform can be analyzed to compute Instantaneous Frequency. The step of normalizing the Intrinsic Mode Function includes: identifying local maximum values in one of the Intrinsic Mode Functions, constructing an envelope signal from the identified local maximum values, dividing the Intrinsic Mode Function by the envelope signal, and repeating the above steps for all of the Intrinsic Mode Functions.

In another embodiment of the present invention, the Intrinsic Mode Functions can be normalized by dividing the Functions by their Hilbert Transforms.

From the Normalized Hilbert Transform, this invention teaches how to calculate an error index according to the following equation:

$$E(t) = [abs(\text{Hilbert Transform}(y(t))) - 1]^2,$$

wherein y(t) is the Intrinsic Mode Function. This error, which is a function of time, gives a local measure of the error incurred during the process of Normalized Hilbert Transform. In other words, if the quadrature and the Hilbert Transform are identical, the error should be zero.

DETAILED DESCRIPTION OF PREFERRED EMBODIMENT OF THE INVENTION

Figure 1:
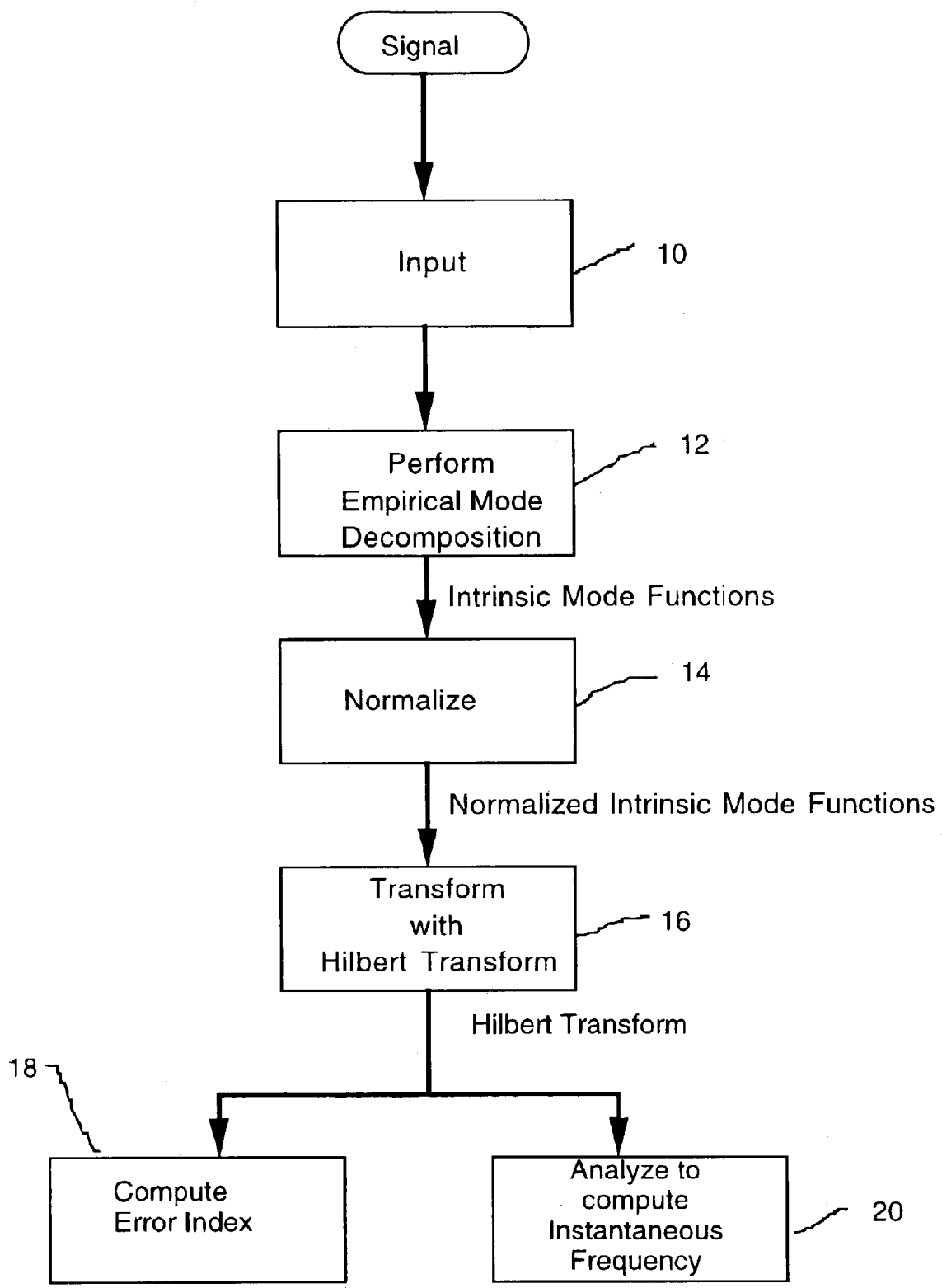
FIG. 1 is a flowchart of the method for computing Instantaneous Frequency according to this present invention.

Before describing the Normalized Amplitude Hilbert Transform (NAHT) and the Normalized Hilbert Transform (NHT) in detail, the definition and physical meaning of the Instantaneous Frequency (IF) in general and a related theorem will be discussed.

Definitions of Frequency

Frequency is an essential quantity in the study of any oscillatory motion. Based on elementary physics, the definition of frequency, $\omega$, is simply the inverse of period, T; that is $$\omega = \frac{1}{T}. \quad (1)$$

Therefore, the most direct way of determining the frequency should be the measure of the time intervals between consecutive zero-crossings. This is very clear for a simple sinusoidal wave train, where the period is well defined. For real data, the period is no longer easily measured, for there might be multi-extrema between two consecutive zero-crossings. As a result, the zero-crossing method has never found any practical use. We will propose a generalization for it in this application in later sections.

In the dynamic system of a periodic motion, the frequency again becomes an important measure. An elegant method to determine the frequency is through the variation of the Hamiltonian, H(q, p), where q is the generalized coordinate, and p is the generalized momentum. Then the frequency is given by $$\omega(A) = \frac{\partial H(A)}{\partial A}, \quad (2)$$

in which A is the action variable defined as $$A = c \int p \, dq, \quad (3)$$

where the integration is over a complete period of rotation. The frequency so defined is varying with time, but the resolution is no finer than the averaging over one period, for the action variable is an integrated quantity. Thus, the frequency defined by Equation (3) is equivalent to the inverse of the period, the classical definition of frequency.

The most commonly accepted definition of frequency is in classical wave studies. Starting with the assumption that the wave surface is represented by a 'slowly' varying function, we can propose that there exists an amplitude function a(x, t), and a phase function θ(x, t), such that the wave profile is the real part of the complex valued function, $$\zeta(x,t) = R(a(x,t)e^{i\theta(x,t)}). \quad (4)$$

The frequency and the wave number are defined as $$\omega = -\frac{\partial \theta}{\partial t} \text{ and } k = \frac{\partial \theta}{\partial x}. \quad (5)$$

Cross differentiating the frequency, $\omega$, and wave number, k, one immediately obtains the wave conservation equation, $$\frac{\partial k}{\partial t} + \frac{\partial \omega}{\partial x} = 0, \quad (6)$$

which is one of the fundamental laws governing the wave motion. As we can see here, it all started from the 'slowly' varying assumption, which enables us to write the complex representation given in Equation (4). We shall revisit this assumption and the consequences later.

All of the above definitions of frequency can only be meaningful for extremely narrow band signals. (or, the mono-component functions, in which the numbers of zero-crossings and the extrema shall equal). In practical data analysis, the data is a real variable, which may have multi-extrema between consecutive zero-crossings. Then, there will not be a frequency value at any given time. Rather, we should look for the frequency content in a data set, which is defined through Fourier Transform traditionally. Thus, for a time series, x(t), we have $$x(t) = R \sum_{j=1}^{N} a_j e^{-i\omega_j t}, \tag{7}$$

where $$a_j = \int_0^T x(t) e^{i\omega_j t} dt, \tag{8}$$

with R indicating the real part of the quantity. Here, the frequency, $\omega_j$, is a constant throughout the time span, T, of the data. Therefore, with this definition, a data shall have many frequency values at any given time, but those frequency values are constant over the whole time span covered by the integration. From the Fourier definition of frequency, we can see that the frequency content would be physically meaningful only if the data is stationary and the process, linear over the integrating span.

A slight generalization of the Classic Fourier Transform is to break the data into limited spans. Thus the frequency value can still vary, but is assumed to be constant, or at a slow rate, consummate with the integral span. This integrating operation leads to the fundamental limitation on the Fourier frequency by the uncertainty principle, which states that the product of the frequency resolution, $\Delta\omega$, and the time span over which the frequency value is defined, T, shall not be less than ½. As Fourier Transform theory is established over infinite time span, then theory dictates that this time interval cannot be too short related to the period of the oscillation. At any rate, it is impossible to resolve frequency variation within one period. This seemingly weak restriction has in fact limited the Fourier spectral analysis to linear and stationary processes only.

In the real world and in theoretical studies, the conditions of ever changing frequency are common, if not prevailing. A chirp signal is one class of the signals used by bats as well as in radar. The frequency content in speech, though not exactly a chirp, is ever changing too. Furthermore, for any nonlinear system, the frequency is definitely modulating not only among different oscillations, but also within one period as discussed by Huang et al (1998). Let us take the typical nonlinear Duffing equation as an example, $$\frac{d^2 x}{dt^2} + x + \varepsilon x^3 = \gamma \cos \omega t, \tag{9}$$

in which $\varepsilon$ is a parameter, and the right hand term is the forcing function of magnitude $\gamma$ and frequency $\omega$. This cubic nonlinear equation can be re-written as $$\frac{d^2 x}{dt^2} + x(1 + \varepsilon x^2) = \gamma \cos \omega t, \tag{10}$$

where the term in the parenthesis can be regarded as a single quantity representing the spring constant or the pendulum length of the nonlinear oscillator. As this quantity is a function of position, the frequency of this oscillator will be ever changing with the intra-wave modulations. The geometric consequence of this intra-wave frequency modulation is the waveform distortion; the basic cause is intra-wave frequency modulation. Such phenomena can certainly be better represented with a variable frequency, a frequency assuming different values at different time. This frequency is designated as the instantaneous frequency (IF). Now we have to face the difficulties of defining the instantaneous frequency.

Instantaneous Frequency through Hilbert Transform

A brief history of Instantaneous Frequency can be found in Boashash (1992 a and b). Here, we will only concentrate on certain important historical milestones that led to the method in its present state. The first important step is due to Van der Pol (1946), a pioneer in nonlinear differential equations, who first explored the idea of instantaneous frequency seriously. He proposed the correct expression of the phase-angle as an integral of the instantaneous frequency. The next important step was made by Gabor (1946), who introduced the Hilbert Transform to generate a unique complex signal from a real signal, thus removing the ambiguity of the infinite many possible imaginary parts from one given real data. Here, for the variable x(t), its Hilbert Transform, y(t), is defined as $$y(t) = \frac{1}{\pi} P \int_\tau \frac{x(\tau)}{t - \tau} d\tau, \tag{11}$$

with P indicating the Cauchy principal value of the complex integral, form a complex conjugate pair. Thus, we have $$z(t) = x(t) + i y(t) = a(t) e^{i\theta(t)}, \tag{12}$$

in which $$\theta(t) = \tan^{-1} \frac{y(t)}{x(t)}. \tag{13}$$

In this representation, the original data x(t) becomes $$x(t) = R\{a(t) e^{i\theta(t)}\} = a(t) \cos \theta(t). \tag{14}$$

For the analytic pair, the instantaneous frequency can be defined as the derivative of the phase function of the complex pair given by $$\omega(t) = \frac{d\theta(t)}{dt} = \frac{1}{a^2}(xy' - yx'). \tag{15}$$

In general, the phase function is a function of time; therefore, the frequency should also be a function of time. The value at any given time is the instantaneous frequency at that time. This definition of frequency bears striking similarity with that of the classical wave theory. As the Hilbert Transform exists for any function of $L^2$ class, there is a misconception that one can put any function through this operation and obtain a physically meaningful instantaneous frequency as in Hahn (1995).

Such an approach has created great confusion for the meaning of the instantaneous frequency in general, and tarnished the Hilbert Transform in particular. One of the most common misconceptions of Hilbert Transform is to apply it to functions consisting of two or more individual simple wave components. Although recent investigators have realized that for the Hilbert Transform to give meaningful answers, the data have to be mono-component, no rigorous definitions of the mono-component function is given. Most users simply resort to band pass filtering to generate the signal for their applications (Meville, 1983). As the filters are Fourier based, the filtering process inevitably distorts the waveform of the fundamentals, and makes the filtered results artificially smooth and linear.

The next important step in application of the Hilbert Transform was due to Bedrosian (1963), who gave the necessary conditions for obtaining a meaningful HT result of the product of functions. This enables us to write the Hilbert Transform of the envelope and carrier as $$H\{a(t)\cos\theta(t)\}=a(t)\,H\{\cos\theta(t)\}, \tag{16}$$

provided that the Fourier spectra of the envelope and the carrier are non-overlapping. Even with this important result, there is a persistent difficulty for writing $$H\{\cos\theta(t)\}=\sin\theta(t), \tag{17}$$

for arbitrary function of θ(t). This difficulty has been ignored by most investigators including Boashash (1992a). It is true that for simple functions of θ(t), the Hilbert Transform is the exact quadrature, but this is not true for arbitrary functions of θ(t), as pointed by Nuttall (1966) and Huang et al (1998). The determination of the difference between the Hilbert Transform and the quadrature is the next important step in the HT development; it was due to Nuttall (1966), who stated that for any given function $$x(t)=a(t)\cos\theta(t), \tag{18}$$

for arbitrary a(t) and θ(t) not necessarily narrow band functions, and if the Hilbert Transform of x(t) is given by xh(t), and the quadrature of x(t) is xq(t), then $$E = \int_{t=-\infty}^{\infty} [xh(t)-xq(t)]^2\,dt = 2\int_{-\infty}^{\omega_0} F_q(\omega)\,d\omega, \tag{19}$$

where $$F_q(\omega) = F(\omega) + i\int_{-\infty}^{\infty} a(t)\sin\theta(t)e^{-i\omega t}\,dt, \tag{20}$$

in which F(ω) is the spectrum of the signal, and $F_q(\omega)$ is the spectrum of the quadrature of the signal. Therefore, the necessary and sufficient conditions for the Hilbert Transform and quadrature to be identical is that E=0. That is the spectrum of the modulation signal has to be one-sided. Unfortunately, there are two deficiencies in this important result: The first one is that the result is expressed in terms of the quadrature spectrum, which is an unknown quantity. The second is that the result is given as an overall integral, which provides a global measure of the agreement. Cohen (1995) has sharpened the result, but only succeeded in given an upper bound on the error at any given time.

As we can see, all these important steps were ready by the late sixties, yet the applications of the Hilbert Transform have still attracted incessant criticisms. Most of the criticisms are the results of ignoring the restrictions listed in the above. If one adheres to the restrictions, one would find that the data has to be so narrow banded. As most of data are not narrow banded; therefore, most investigators found the HT method has no practical use. The most critical difficulty is that, there is no effective way to decompose any given data into mono-component functions. This last restriction effectively blocked the wide acceptance of HT as a useful method in data analysis.

It is clear that for any data, complicated data especially, that they consist of numerous superimposing modes. Therefore, to define only one instantaneous frequency value for any given time is not meaningful. Because of the existence of simultaneous multi-components, and because the instantaneous frequency is needed only when the process is nonstationary, even the averaged value as in the Wigner-Ville distribution (see, for example, Flandrin, 1999) is not meaningful, for the difficulties involved in the averaging procedure for nonstationary processes. We will return to this point later when we discuss the Wigner-Ville distribution.

To fully consider the effects of multi-components, we really need a decomposition method to separate the components completely and orthogonally. In case of nonlinear data, the orthogonality condition needs to be relaxed as discussed by Huang, et al (1998). Only recently, did Huang et al (1998) proposed the Empirical Mode Decomposition (EMD) (step 12), which produces Intrinsic Mode Functions that are both mono-component and symmetric. This is a critical step toward making HT practical. Referring to FIG. 1, a signal is introduced (step 10) and EMD prepares the data into the IMF (step 12), which satisfies the necessary condition for not having negative frequency from HT. With the EMD, we finally remove an important practical blockage, and make Hilbert Transform a truly practical method in determining the Instantaneous Frequency, but difficulties still exist.

Normalized Amplitude Hilbert Transform (NAHT) and Error Index

Even with the EMD, we still can run in the difficulties as stated by Bedrosian and Nuttall Theorems. Both of these limitations have firm theoretical foundations. One aspect of this invention presents a method, the Normalized Amplitude Hilbert Transform (NAHT), designed specifically to circumvent the limitation set by the Bedorsian Theorem, and to provide a sharp local measure of error when the quadrature and the Hilbert Transform do not agree. Before describing the method, we have to stress that the data has to be IMF functions through the EMD method. The NAHT method involves the following steps:

First, referring to step 14 in FIG. 1, identify all the local maxima in the EMD decomposed data. Then connect all the maxima with a cubic spline curve, which should give the local amplitude of the data, A(t). Then, we can use this amplitude to normalize the data by $$y(t) = \frac{a(t)\cos\theta(t)}{A(t)} = \left(\frac{a(t)}{A(t)}\right)\cos\theta(t). \tag{21}$$

As A(t) is the spline of all the maxima, a(t)/A(t) should normalize y(t) with maxima all at unity. Thus, we effectively separate the amplitude from the carrier oscillation. Then, we will compute the instantaneous frequency from this normalized IMF, y(t). Ideally, without the limitation of Bedrosian Theorem, the Hilbert Transform of y(t) (step 16) should be the quadrature of the function, but the limitation of Nuttall Theorem is still there. To establish an error bound, we argue the following way:

If the Hilbert Transform is indeed the quadrature, then the absolute value of it should be one. In other words, if the quadrature and the Hilbert Transform are identical, the error should be zero. Any deviation is an indication of differences between the quadrature and Hilbert Transform. Therefore, an error index can be define and computed (step 18) as $$E(t)=[abs(\text{Hilbert Transform}(y(t)))-1]. \tag{22}$$

Unlike the Error bound established by the Nuttal Theorem, this error index is a function of time, giving a local measure of the error incurred in this process of Normalized Amplitude Hilbert Transform. An acceptable error index can be predetermined for the process. Thus, while analyzing the Transform to compute Instantaneous Frequency (step 20), any Instantaneous Frequency with an error index below the predetermined value can be ignored.

Based on our experience, the major source of the error comes from two sources: The first source is due to drastic change of amplitude, then the spline fitting will not be able to turn sharp enough. The second source is due to the nonlinear nature of the phase function θ(t). As discussed in Huang et al (1998), when the phase function is not an elementary function, the differentiation of the Hilbert Transform determined phase will not be identical to that from the quadrature phase. Unfortunately, there is no more detailed measure of the error than what is given in Equation (22). We have to use other means to separate the source of the error in the specific individual case considered.

Normalized Hilbert Transform (NHT)

Having given the NAHT method, we can also present a variation of it by using the envelope determined through Hilbert Transform as the base for normalization. We designate this variation as Normalized Hilbert Transform (NHT). In most cases this approach works just as well. But considering that the difficulties actually arise from the difficulty in Hilbert Transform, we have to be very careful in using the Hilbert Transform (step 16) from the data in any operation. We will discuss this in the examples later.

Additional Methods for Determining Instantaneous Frequency

Other than the Hilbert Transform, there are other methods for determining the IF, each based on different assumptions, and each gives slightly different values for IF from the same data. Before starting, we have to emphasize that for the instantaneous Frequency to be physically meaningful, the data used in two of the following methods will have to be 'mono-components'. In fact in most of the definitions, the requirement is even more stringent: the data have to be Intrinsic Mode Functions as defined by Huang et al (1998), where the condition has been justified for the Hilbert Transform. In this section we shall discuss the different approaches, and compare the results from them.

1. Teager Energy Operator

The second definition of instantaneous frequency is by the Teager Energy Operator (TEO, see, for example, Kaiser, 1990). The idea is based on a signal of the form $$x(t) = a \sin \omega t, \quad (23)$$

then, an energy operator can be defined as $$\Psi(x) = \dot{x}^2 - x\ddot{x}. \quad (24)$$

For this simple oscillator, we have $$\omega(x) = a^2\omega^2; \text{ and } \Psi(\dot{x}) = a^2\omega^2. \quad (25)$$

By manipulating the two terms in Equation (25), we have $$\omega = \sqrt{\frac{\psi(\dot{x})}{\psi(x)}}; \text{ and } a = \frac{\psi(x)}{\sqrt{\psi(\dot{x})}}. \quad (26)$$

Thus one can obtain both the amplitude and frequency with the energy operator. Kaiser (1990) and Maragos et al (1993 a, b) have extended the energy operator approach to the continuous functions of AM-FM signals, where both the amplitude and the frequency are functions of time. In those cases, the energy operator will offer an approximation, which could give accurate values, provided the amplitude and frequency are slowly varying. As this method is based on a linear model, the energy operator approach will also break down whenever the wave profiles have any harmonic distortions. A very strong point of the energy operator is its super localization property, a property un-surpassed by any other approaches. This localization property is because the method is based on differentiation; therefore, it involves at most five neighboring data points to evaluate the frequency at the central point. No integral transform is needed as in Fourier or Hilbert Transforms.

2. Wavelet Analysis

Wavelet is a very popular data analysis method (see, for example, Daubechies, 1992); unfortunately, it has been misused by many. True, wavelet offers time-frequency analysis with uniform scale (or frequency) resolution, but it is not designed for time-frequency analysis. The most serious weakness of wavelet analysis is the limitation of the uncertainty principle: To be local, a base wavelet cannot contain too many waves; to have fine frequency resolution, a base wavelet will have to contain many waves. As the numerous examples offered by Huang et al (1998 and 1999) have shown, the uniformly poor frequency resolution renders wavelet only as a qualitative tool for time-frequency analysis. It is, however, very useful for data compression, image outline findings, for example. As our emphasis is on Instantaneous Frequency evaluation, we will not discuss this method in further comparisons.

3. Wigner-Ville Distribution 3

Wigner-Ville distribution (see, for example, Cohen, 1995) is defined as $$V(t, \omega) = \int_{-\infty}^{\infty} x\left(t + \frac{\tau}{2}\right)x^*\left(t - \frac{\tau}{2}\right)e^{-i\omega t}d\tau. \quad (27)$$

By definition, the marginal distribution, by integrating the time axis out, is identical to the Fourier Power density spectrum. Even though the full distribution does offer some time-frequency properties, it inherits all the shortcomings of Fourier analysis. The additional time variable offers a center of gravity type of weighted mean frequency as $$\overline{\omega(t)} = \frac{\left(\int_{-\infty}^{\infty} \omega V(t, \omega) d\omega\right)}{\left(\int_{-\infty}^{\infty} V(t, \omega) d\omega\right)}. \quad (28)$$

Here we have a single value as a mean for all the different components. For lack of details, we will not conduct further comparisons of other results with the Wigner-Ville distribution.

Having presented all these methods, we will present some inter-comparisons of the results in the next sections.

Inter-comparisons of results from different methods and Discussions

It should be point out that, other than the wavelet and Wigner-Ville distribution, the signals, in all other instantaneous frequency approaches, have to be 'mono-component', or Intrinsic Mode Functions (IMF) as defined by Huang et al (1998).

Let us apply these three methods to some examples. The first example is the exponentially decayed sine wave given by $$x(t) = \exp\left(-\frac{t}{128}\right)\sin\left(2\pi\left(\frac{t}{512}\right)^3\right); \quad t = 0:1024. \quad (29)$$

Figure 2:
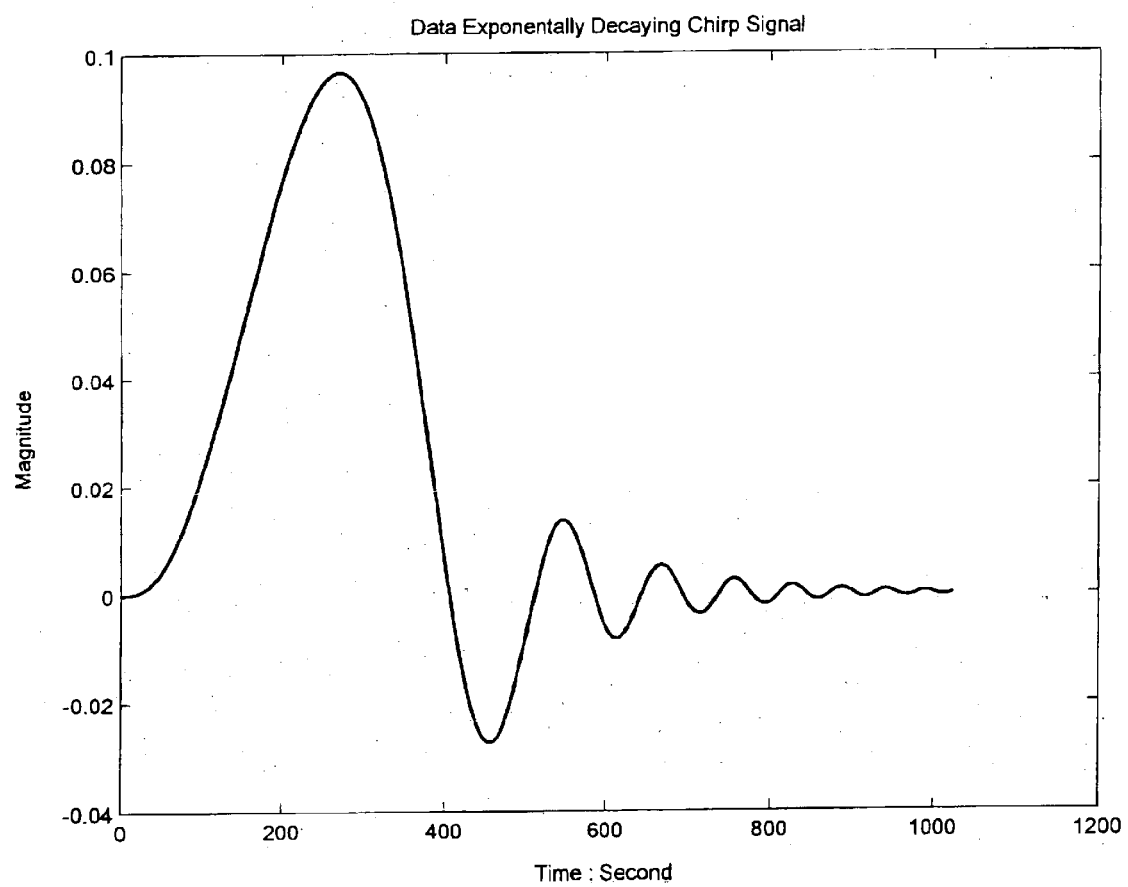
FIG. 2 is a graph of data of an exponentially decaying chirp signal.
Figure 3:
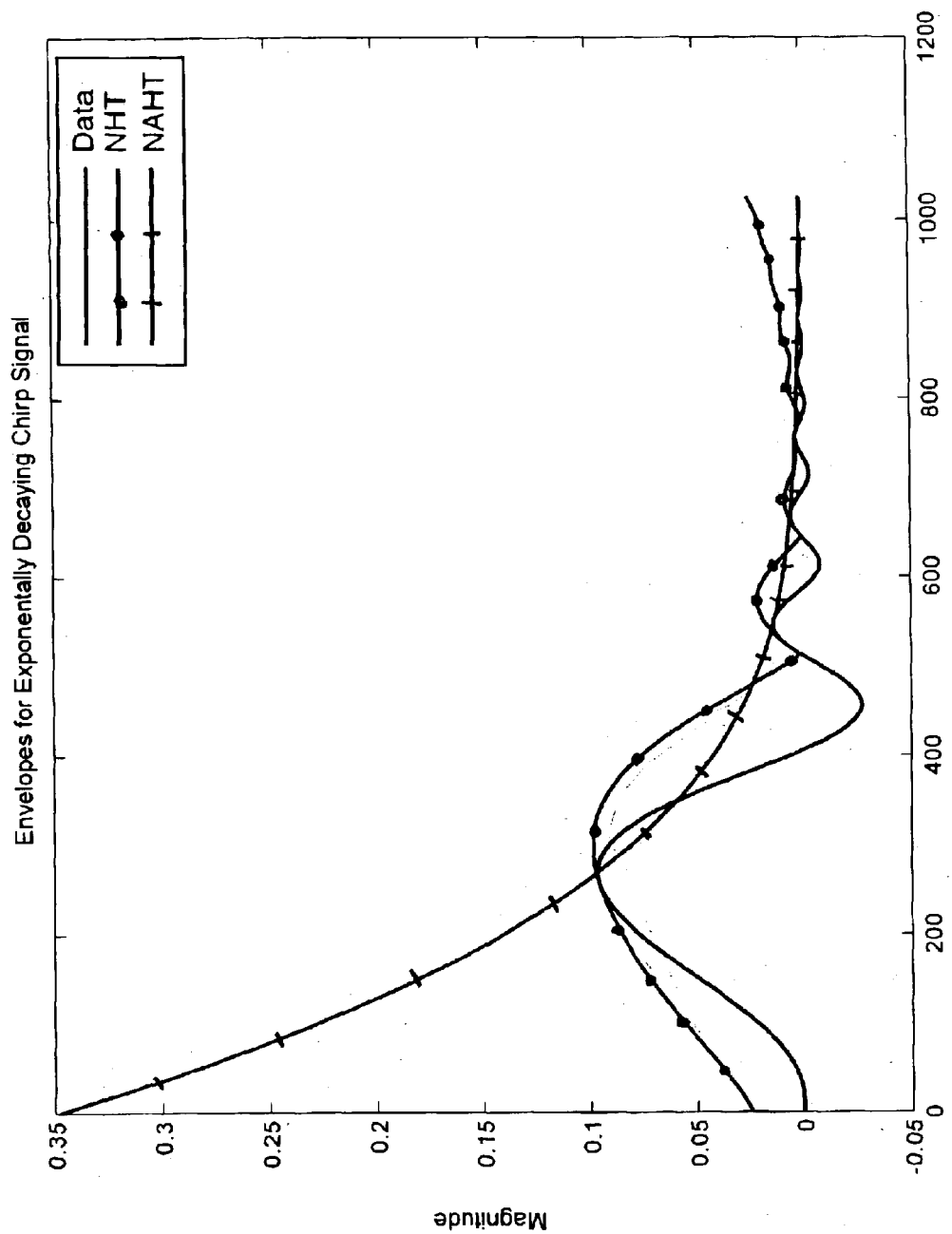
FIG. 3 is a graph of envelopes for the data shown in FIG. 2.
Figure 4:
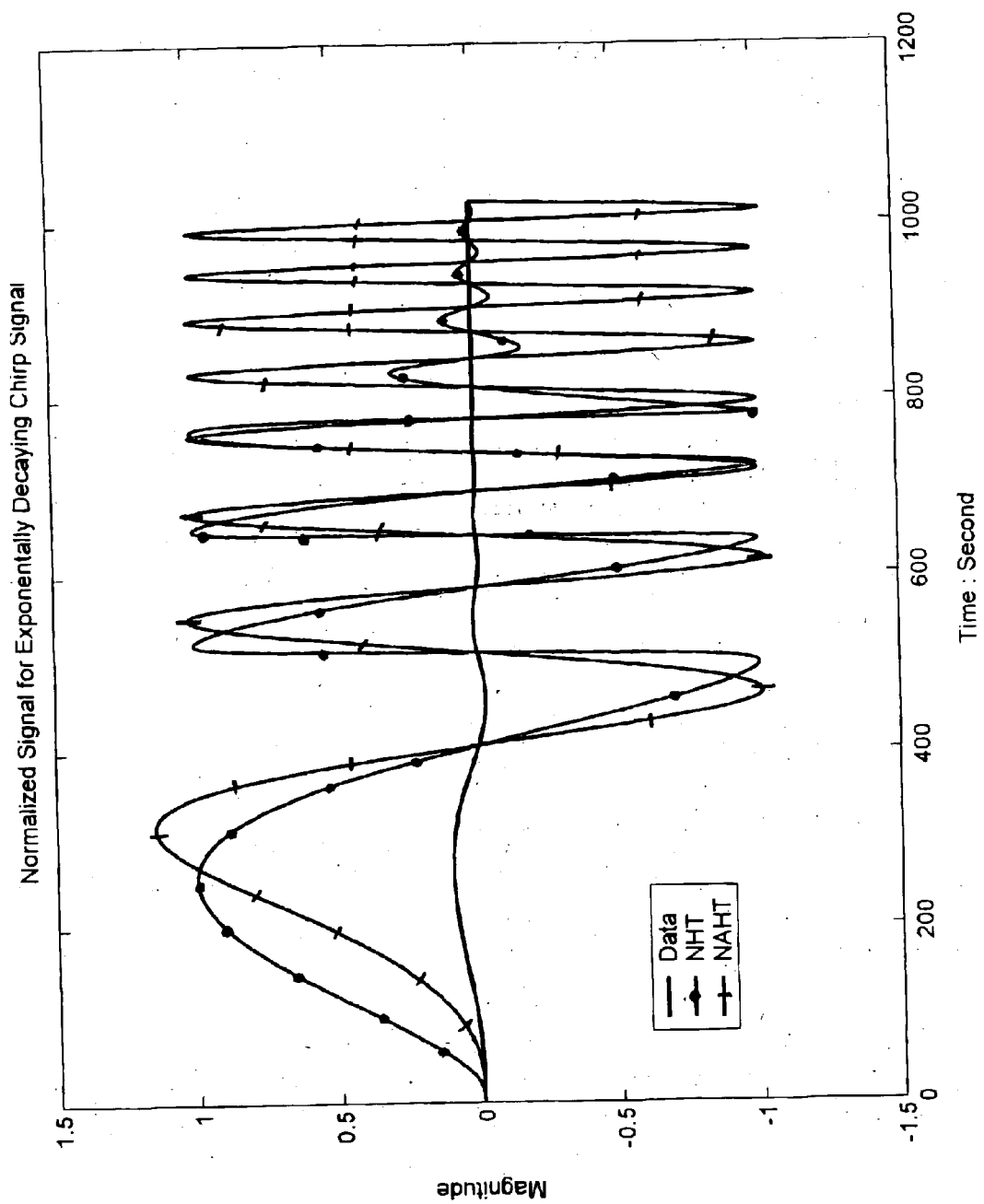
FIG. 4 is a graph of normalized signals for the data shown in FIG. 2.
Figure 5:
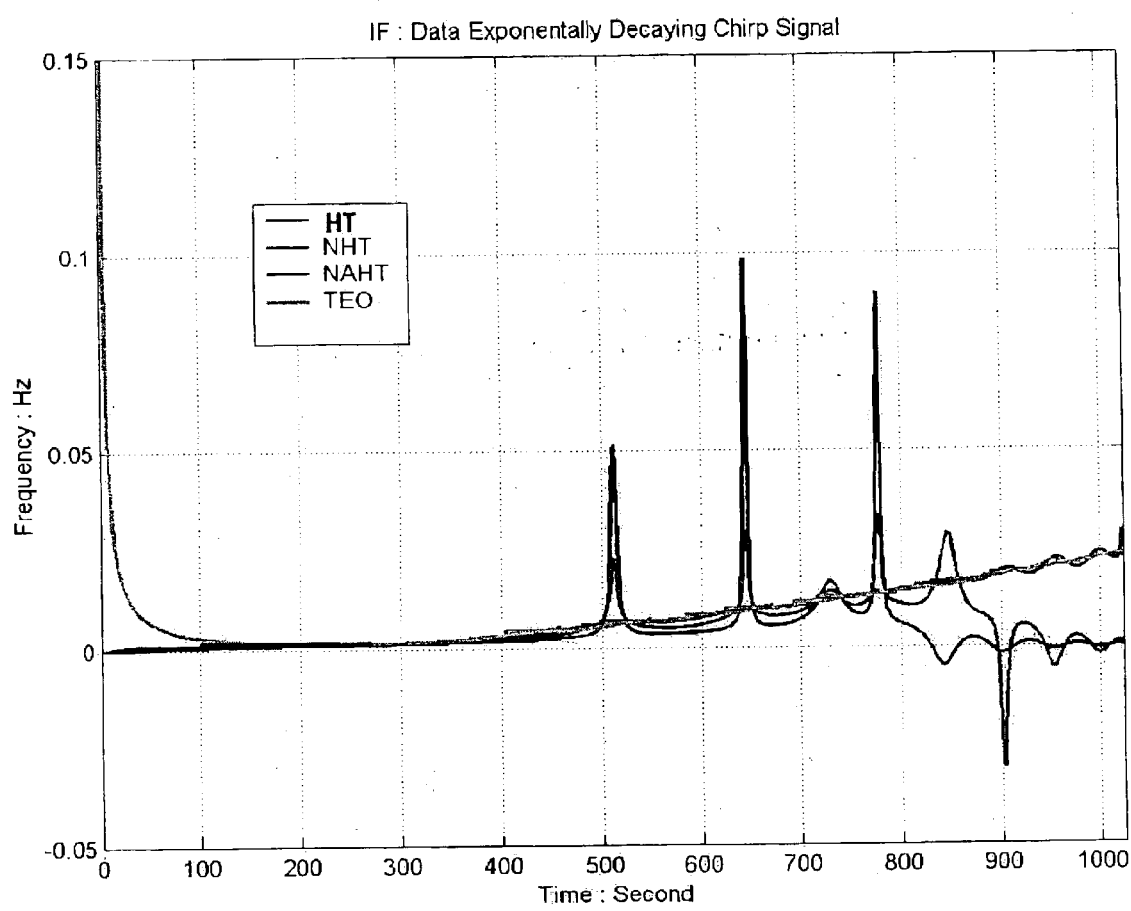
FIG. 5 is a graph of Instantaneous Frequency obtained using different techniques for the data shown in FIG. 2.

FIG. 2 gives the data. Here we have a drastically decaying cubic chirp signal, in which both the amplitude and frequency are ever changing with large gradients of change. FIG. 3 gives the envelopes determined from NHT and NAHT methods. One can immediately see that the drastic change of amplitude in the data has rendered the amplitude from NHT grossly inaccurate. This will lead to poor normalization as shown in FIG. 4. The consequence is that the Instantaneous Frequency determined from NHT is a slight improvement over HT, but its values are very different from all the other methods as shown in FIG. 5. Here we can see that the Teager Energy Operator (TEO) offers very stable results.

Figure 6:
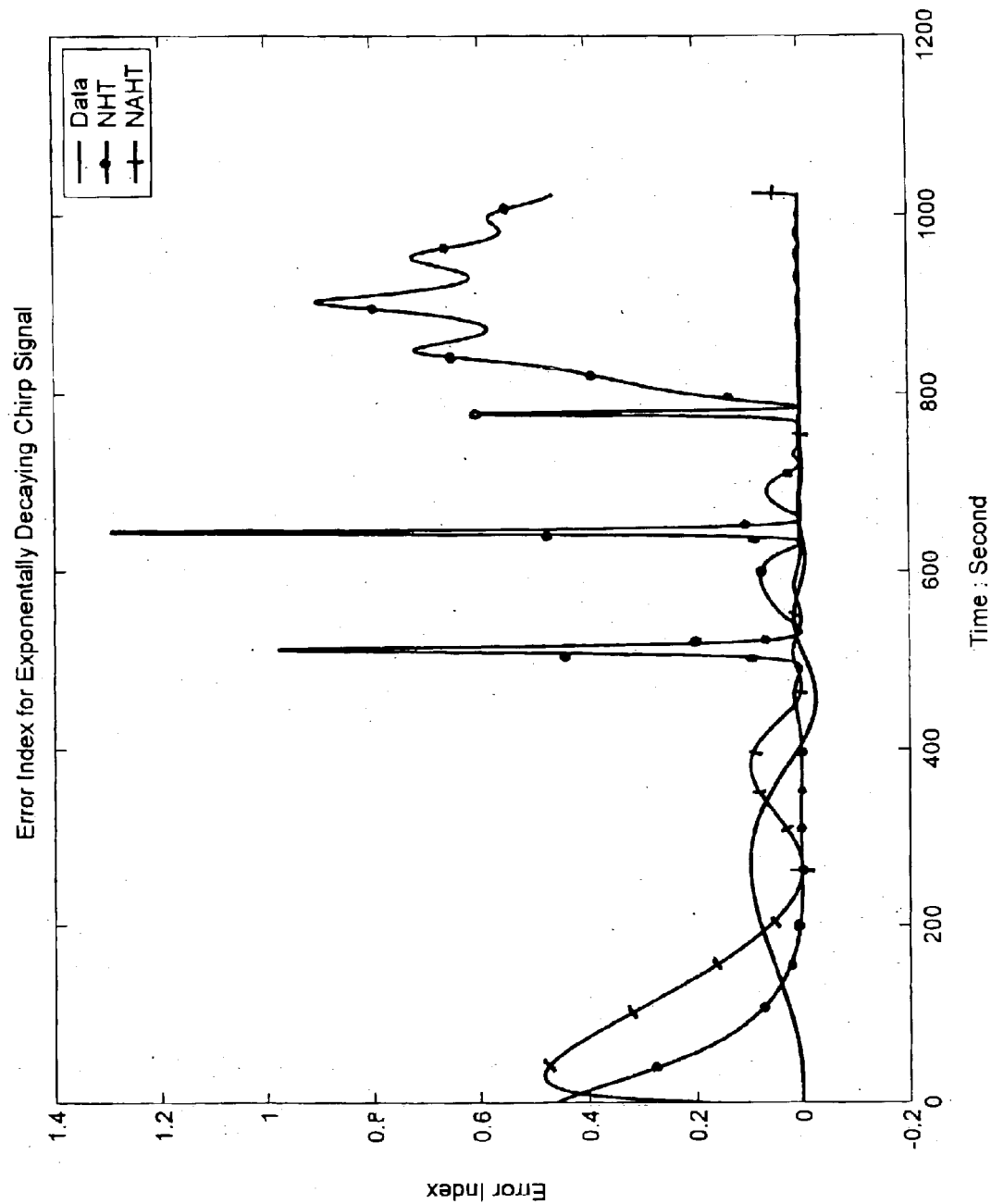
FIG. 6 is a graph of Error Index for the data shown in FIG. 2.

Next, we will examine the error incurred in the methods with the results plotted in FIG. 6. Obviously, the error is much bigger in the NHT than NAHT. Because of this incomplete correction of NHT for this case, we do not recommend using it for general cases.

The second example is a modeled Duffing type wave given by $$x(t) = \cos\left(\frac{\pi t}{64} + 0.3\sin\left(\frac{\pi t}{32}\right)\right); \text{ with } t = 0:1024. \tag{30}$$

Figure 7:
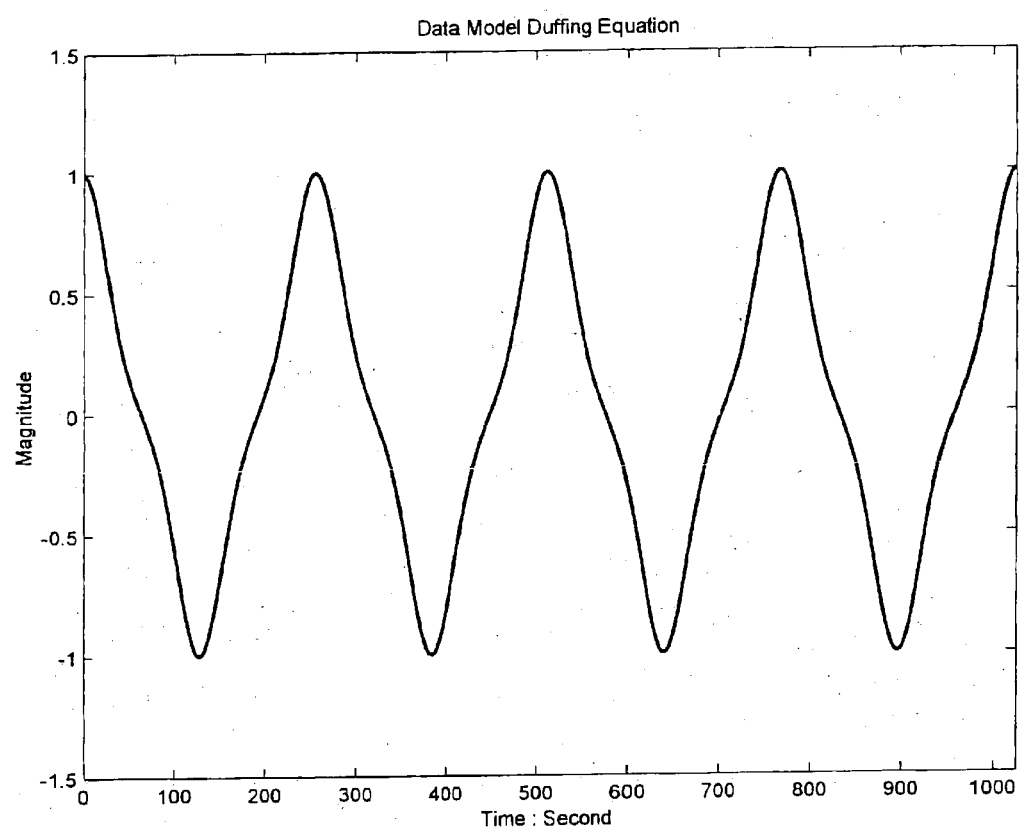
FIG. 7 is a graph of data model Duffing Equation.
Figure 8:
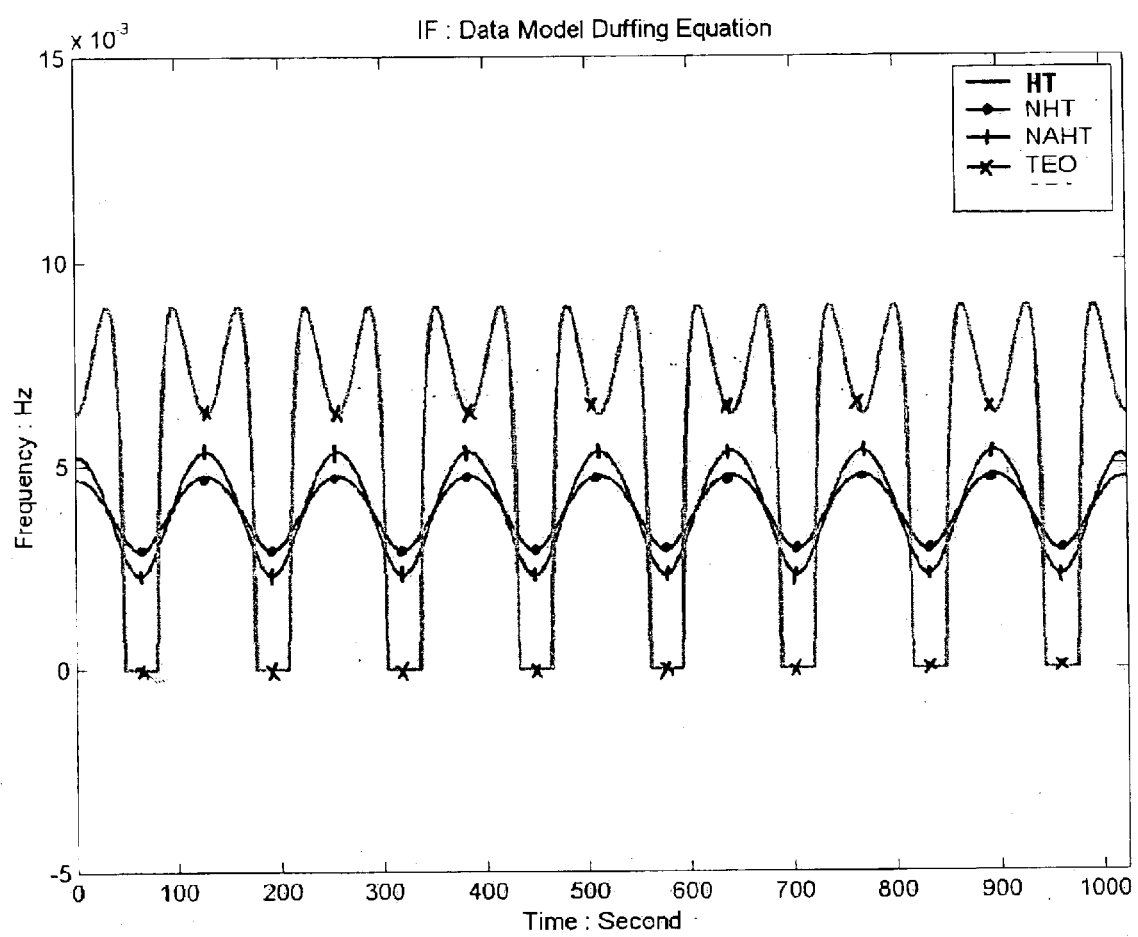
FIG. 8 is a graph of Instantaneous Frequency for the data shown in FIG. 7.

Assuming the sampling rate to be 1 Hz again, the signal is given in FIG. 7. As the amplitude is already normalized, we can proceed without normalization in NAHT. But, we still need to normalize it in the NHT. The Instantaneous frequency is given in FIG. 8. Here we can see clearly that the nonlinear characteristics caused great difficulties in TEO, which gives totally erroneous frequency due to the harmonic distortion of the waveform. In this case the HT and NAHT actually give the same Instantaneous Frequency values, because the amplitude is normalized already. The NHT gives a slightly worse Instantaneous Frequency due to the normalization with the Hilbert Transform. The error indices are small in both NHT and NAHT. The main lesson here is that the TEO is for linear signals, but not the intra-wave frequency modulation, which is a sure sign of signal from nonlinear processes.

Figure 9:
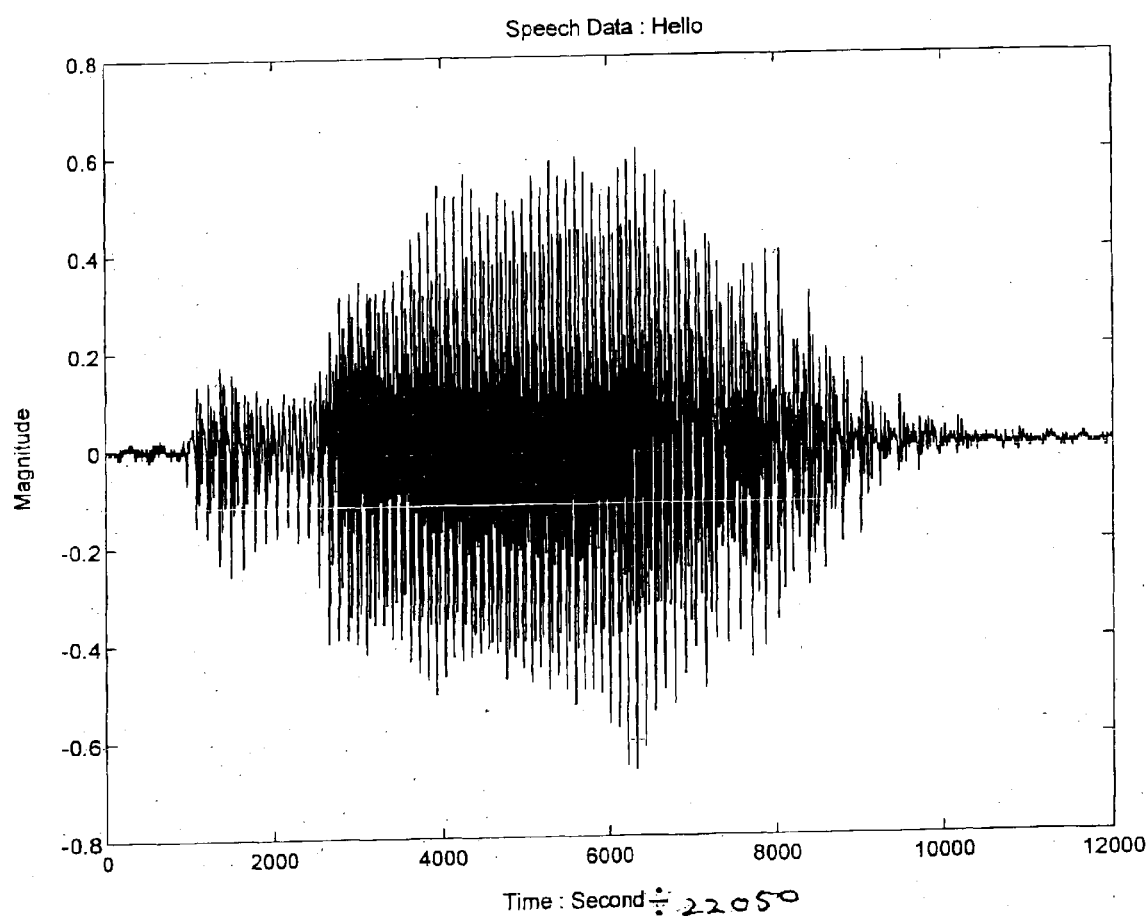
FIG. 9 is a graph of an acoustical signal data recorded from a speaker saying 'Hello.'
Figure 10:
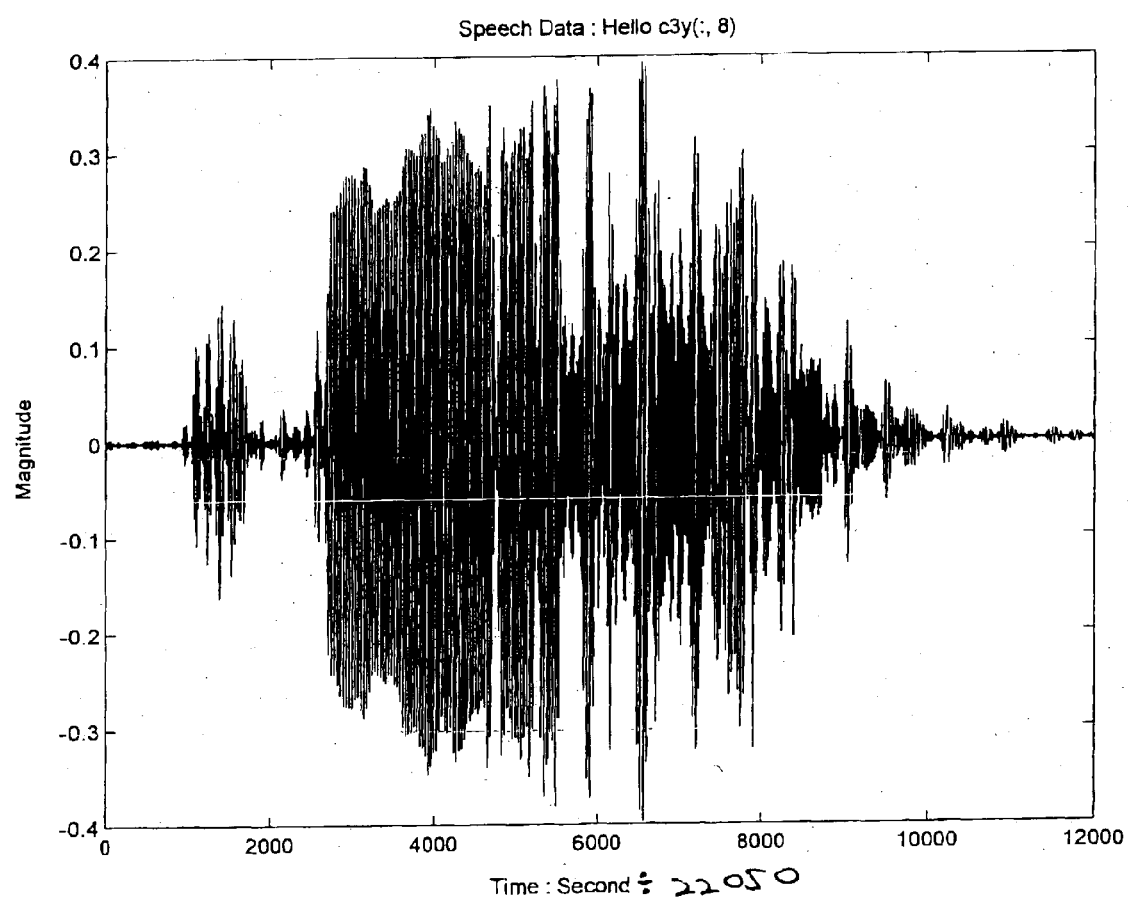
FIG. 10 is a graph of the intrinsic Mode Function (IMF) component 8 of the data shown in FIG. 9.
Figure 11:
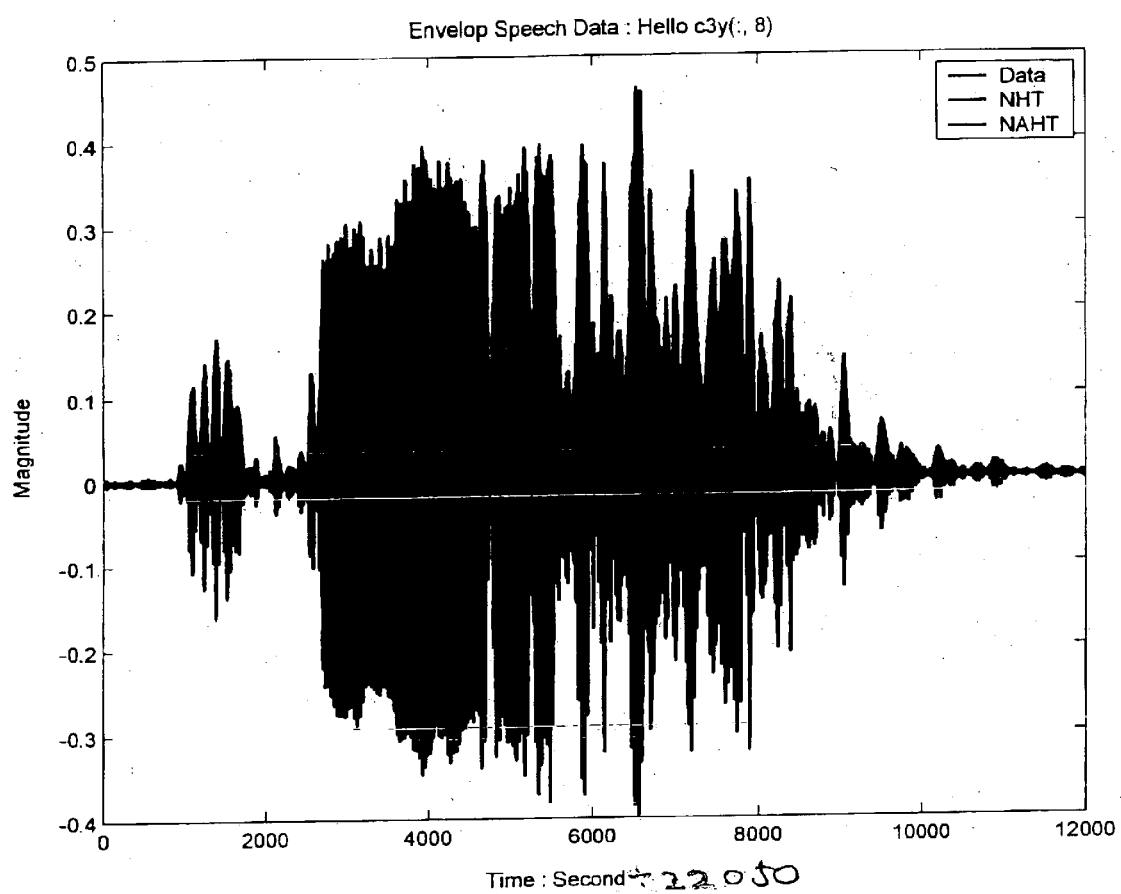
FIG. 11 is a graph of envelopes for the data shown in FIG. 9.
Figure 12:
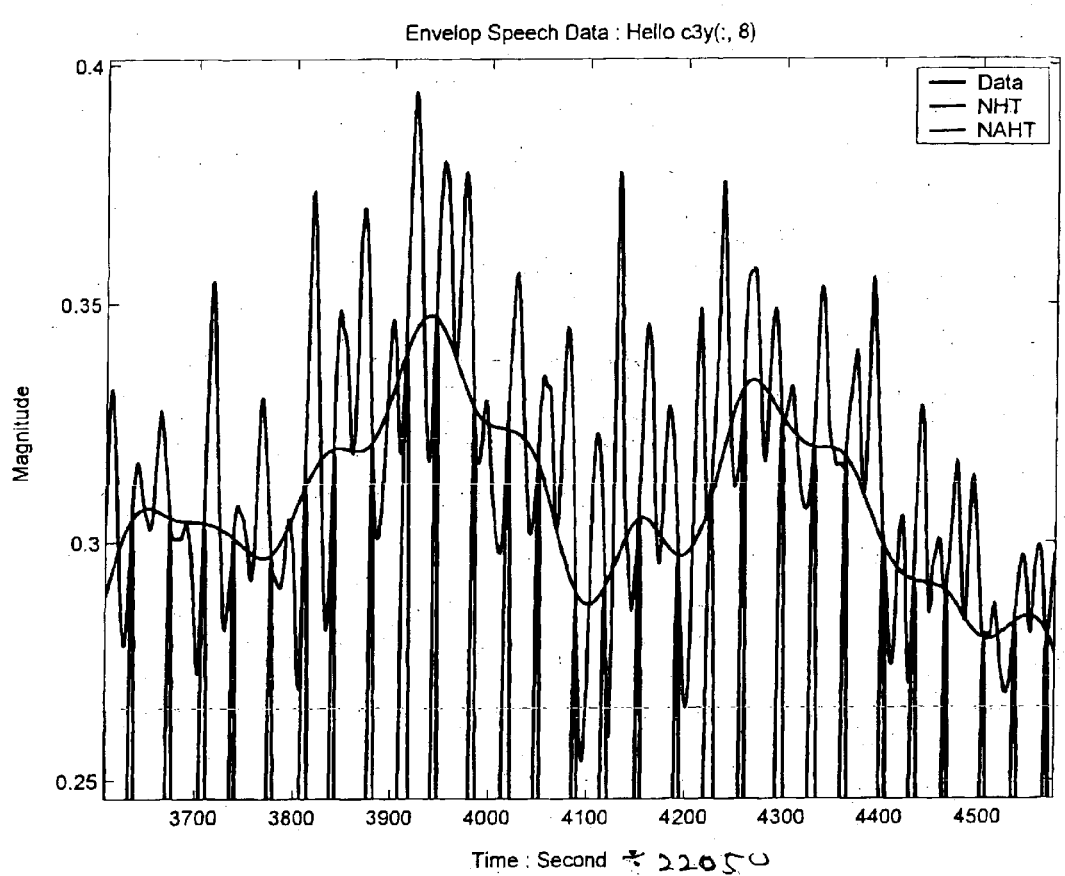
FIG. 12 is a graph of a short section of FIG. 11.

The final example is an IMF extracted from the voice record of 'Hello.' The original signal is given in FIG. 9, with the IMF component 8, the most energetic one, given in FIG. 10. First, we will present the envelopes obtained from both the spline and Hilbert Transform fittings as in FIG. 11. A short section is amplified in FIG. 12 to show the fitting in details. The spline fitting works well.

Figure 13:
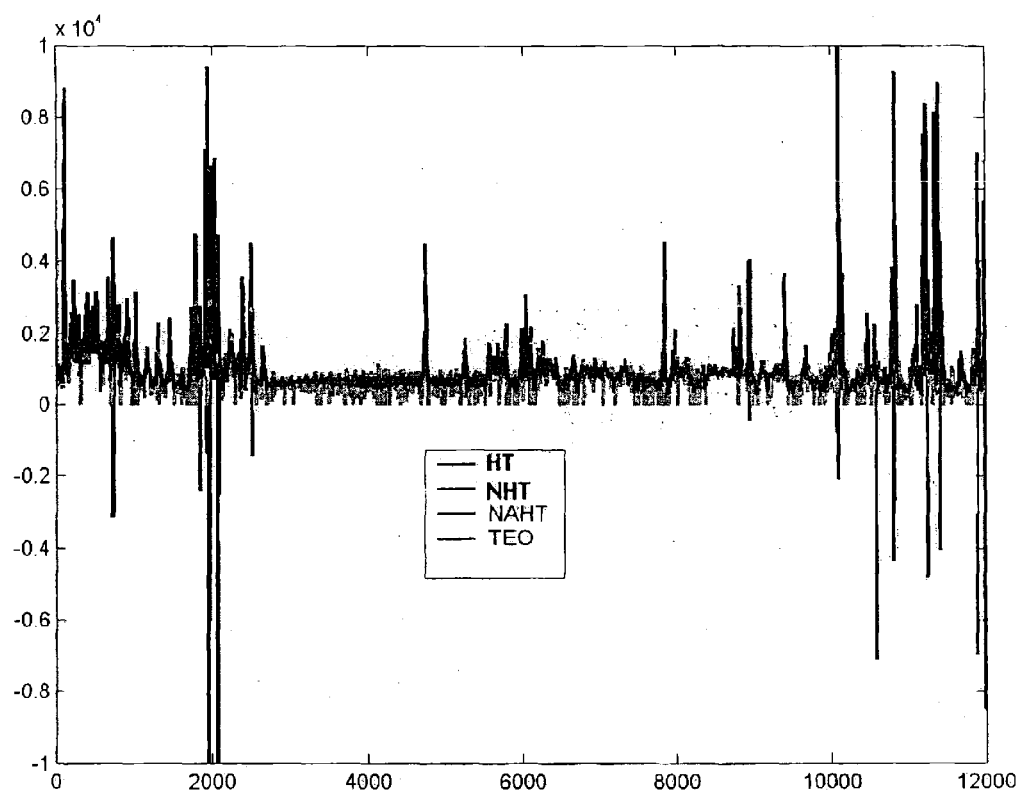
FIG. 13 is a graph of the Instantaneous Frequency plotted for the data shown in FIG. 9.
Figure 14:
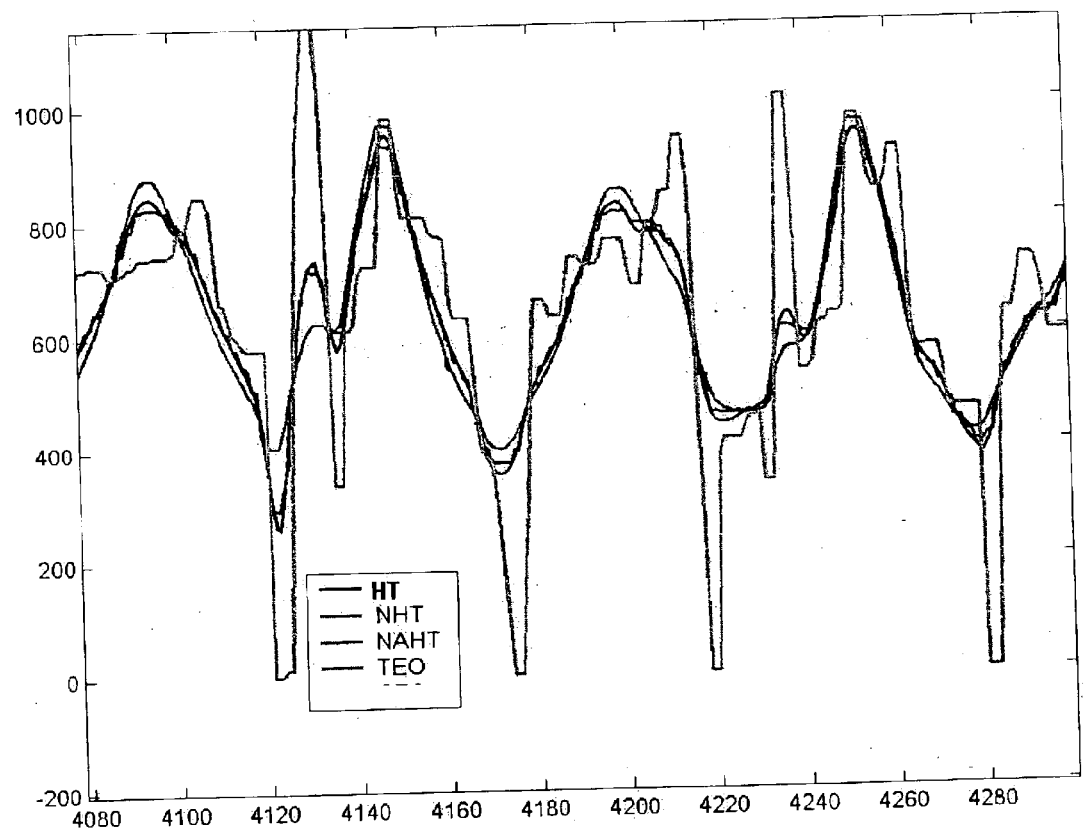
FIG. 14 is a graph of a short section of FIG. 13.
Figure 15:
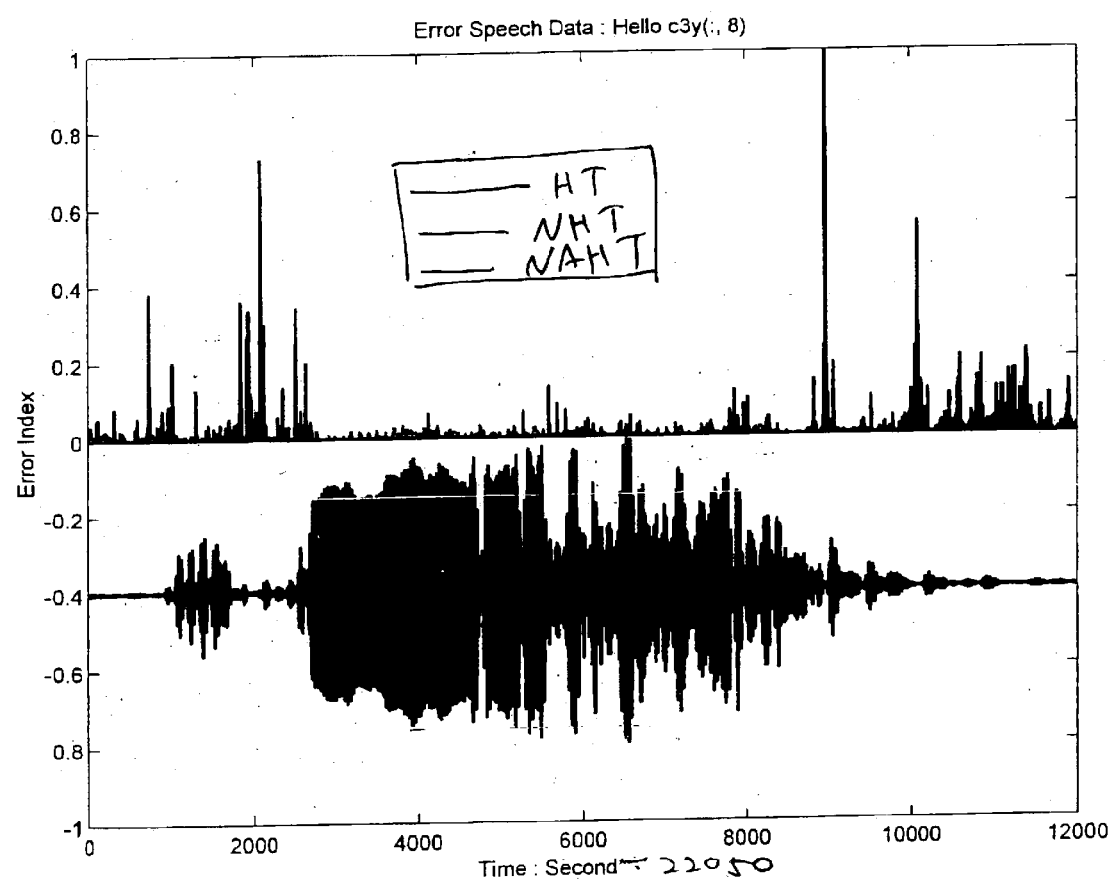
FIG. 15 is a graph of Error Index for the data shown in FIG. 9.

Now, we plot the Instantaneous Frequency in FIG. 13. One can immediately see the numerous instances when the TEO value drops to the zero level, an indication of nonlinear processes. One can also see the large fluctuations of the HT and NHT determined Instantaneous Frequency. These values all happen, as expected, at the locations when the signal has large amplitude fluctuations. The values obtained from the NAHT have certainly corrected these anomalies from the Hilbert Transform. In fact, the results from the NAHT have never dipped to zero or negative level as in the HT or NHT cases. The error indices of the NHT and NAHT are given in FIG. 15.

From this example, we can see that all the methods presented here perform acceptably. TEO is very local, for it is totally based on differentiation operations. But it is also derived from a linear assumption; therefore, when there is pronounced waveform distortion, the TEO result shows zero frequency even after the five-point-medium-filtering. The strength and weakness of each are summarized as follows:

The Hilbert Transform (HT) is mathematically most elegant, and intuitively pleasing. Yet in detailed examination, we find that the HT has certain limitations. Mathematically, the only signal that will give acceptable transforms has to obey the Bedrosian theorem (1963). When the data violate the conditions given in the Bedrosian theorem, HT will give erroneous results. Fortunately, this only occurs when the amplitude varies greatly, and the problem invariably occurs at regions where local amplitude values are minimum. This makes the HT not perfectly local. A windowed approach, of using limited data piecewise by limiting the amplitude variation within the window to a certain pre-assigned value, will improve the answer. Another limitation on the HT is that not all Hilbert Transforms and the functions form the analytic pairs. The consequence is that the frequency will, sometimes, be only an approximation. Even with these limitations, our experience indicates that the results provided by the HT are consistently better than most of the other methods.

If we use the improved HT in the form of NHT or NAHT, the results are drastically improved. As NHT still suffers the consequence of Bedrosian Theorem, it should be used with its limitations in mind. NAHT overcomes the limitation set by Bedrosian Theorem, and offers a local measure of error better than the Nuttall Theorem.

TEO is much more local than the HT. Unfortunately, TEO is based on a linear oscillator; therefore, whenever the signal comes from, nonlinear processes and shows harmonic distortions the TEO breaks down. The best way to use the TEO is to band pass the signal. But band passing is based on the linear Fourier analysis, which will destroy the nonlinear characteristics of the signal.

Depending on applications and data characteristics, and data analysis goals, one or the other of these methods can provide quite satisfactory answers. NAHT is the best overall method for determining the Instantaneous Frequency for nonlinear and nonstationary data.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

What is claimed is:

1. A computer implemented method of analyzing a signal comprising:
   inputting the signal;
   extracting a collection of Intrinsic Mode Functions from the signal via Empirical Mode Decomposition;
   normalizing the Intrinsic Mode Functions; and
   transforming the normalized Intrinsic Mode Functions with a Hilbert Transform.

2. The computer implemented method as in claim 1, further comprising:
   analyzing the normalized Hilbert Transform to determine Instantaneous Frequency.

3. The computer Implemented method as in claim 1, said step of normalizing the Intrinsic Mode Function including:
   identifying local maximum values in one of the Intrinsic Mode Functions;
   constructing an envelope signal from the identified local maximum values;
   dividing the intrinsic Mode Function by the envelope signal; and
   repeating the above steps for all of the intrinsic Mode Functions.

4. The computer method as in claim 3, wherein constructing the envelop of the signal includes:
   connecting all the local maximum values with a cubic spline curve.

5. The computer method as in claim 1, further comprising:

calculating an error index according to the following equation:

$$E(t)=[abs(\text{Hilbert Transform}(y(t)))-1]^2,$$

wherein y(t) is the normalized Intrinsic Mode Function.

6. The computer implemented method as in claim 1, said step of normalizing the Intrinsic Mode Function including:

transforming one of the Intrinsic Mode Functions with a Hilbert Transform;

dividing the Intrinsic Mode Function by the Hilbert Transform; and repeating the above steps for all the Intrinsic Mode Functions.

7. A computer implemented method of analyzing a signal comprising:

inputting the signal;

extracting a collection of Intrinsic Mode Functions from the signal via Empirical Mode Decomposition;

normalizing the Intrinsic Mode Functions; and transforming the normalized Intrinsic Mode Functions with a Hilbert Transform;

calculating an error index according to the following equation:

$$E(t)=[abs(\text{Hilbert Transform}(y(t)))-1]^2,$$

wherein y(t) is the normalized Intrinsic Mode Function.

8. The computer implemented method as in claim 7, further comprising:

analyzing the normalized Hilbert Transform to determine Instantaneous Frequency.

9. The computer implemented method as in claim 7, said step of normalizing the Intrinsic Mode Function including:

identifying local maximum values in one of the Intrinsic Mode Functions;

constructing an envelope signal from the identified local maximum values;

dividing the Intrinsic Mode Function by the envelope signal; and repeating the above steps for all of the Intrinsic Mode Functions.

10. The computer method as in claim 9, wherein constructing the envelop of the signal includes:

connecting all the local maximum values with a cubic spline curve.

11. The computer implemented method as in claim 7, said step of normalizing the Intrinsic Mode Function including:

transforming one of the Intrinsic Mode Functions with a Hilbert Transform;

dividing the Intrinsic Mode Function by the Hilbert Transform; and repeating the above steps for all the Intrinsic Mode Functions.

* * * * *